(12) United States Patent
Muller

(10) Patent No.: US 11,501,214 B2
(45) Date of Patent: Nov. 15, 2022

(54) SYSTEMS AND METHODS FOR MANAGING, DISTRIBUTING AND DEPLOYING A RECURSIVE DECISIONING SYSTEM BASED ON CONTINUOUSLY UPDATING MACHINE LEARNING MODELS

(71) Applicant: Savvi AI Inc., Kentfield, CA (US)

(72) Inventor: Alex Muller, Kentfield, CA (US)

(73) Assignee: Savvi AI Inc., Kentfield, CA (US)

( * ) Notice: Subject to any disclaimer, the term of this patent is extended or adjusted under 35 U.S.C. 154(b) by 0 days.

(21) Appl. No.: 17/590,181

(22) Filed: Feb. 1, 2022

(65) Prior Publication Data

US 2022/0253746 A1 Aug. 11, 2022

Related U.S. Application Data

(60) Provisional application No. 63/146,484, filed on Feb. 5, 2021.

(51) Int. Cl.
*G06N 20/00* (2019.01)
*G06K 9/62* (2022.01)

(52) U.S. Cl.
CPC ............. *G06N 20/00* (2019.01); *G06K 9/623* (2013.01); *G06K 9/6265* (2013.01)

(58) Field of Classification Search
CPC ...... G06N 20/00; G06K 9/623; G06K 9/6265; G06F 9/541
See application file for complete search history.

(56) References Cited

U.S. PATENT DOCUMENTS

| | | | | |
|---|---|---|---|---|
| 2020/0012962 | A1* | 1/2020 | Dent | G06F 9/5011 |
| 2020/0167660 | A1* | 5/2020 | Krishnan | G06N 5/003 |
| 2021/0133630 | A1* | 5/2021 | Dalli | G06N 5/045 |
| 2021/0256310 | A1* | 8/2021 | Roberts | G06N 20/00 |
| 2021/0295205 | A1* | 9/2021 | Ranco | G06F 17/16 |
| 2021/0326782 | A1* | 10/2021 | Achin | G06F 9/5011 |

OTHER PUBLICATIONS

Baylor, "TFX: A TensorFlow-Based Production-Scale Machine Learning Platform", KDD 2017 Applied Data Science Paper KDD'17, Aug. 13-17, 2017, Halifax, NS, Canada. (Year: 2017).*

Karamitsos Ioannis et al., "Applying DevOps Practices of Continuous Automation for Machine Learning", Information, vol. 11, No. 7, Jul. 13, 2020 (Jul. 13, 2020), p. 363, XP055809198, DOI: 10.3390/info11070363 Sections 3.3, 4.2 and 5; figure 6; 15 pages.

(Continued)

*Primary Examiner* — Dave Misir
(74) *Attorney, Agent, or Firm* — Polsinelli LLP

(57) ABSTRACT

The present disclosure relates generally to the generation and deployment of a machine learning-enabled decision engine (MLDE). The MLDE includes decision options that are composed of a discrete list of selectable options. Further, the MLDE includes data inputs that can be used to influence decisions made by the machine learning models of the MLDE. Controls are applied to the MLDE to overlay and bound the decisioning within guidelines established by an operator of the MLDE. Once the MLDE is established, the MLDE is validated and deployed for use by software applications to make decisions.

15 Claims, 11 Drawing Sheets

(56) References Cited

OTHER PUBLICATIONS

Figalist Iris et al., "An End-to-End Framework for Productive Use of Machine Learning in Software Analytics and Business Intelligence Solutions", Nov. 21, 2020 (Nov. 21, 2020), Comuter Vision—ECCV 2020: 16th European Converence, Glasgow, UK, Aug. 23-28, 2020: Proceedings; [Lecture Notes in Computer Science; ISSN 0302-9743], pp. 217-233, XP047590318, ISBN: 978-3-030-58594-5, Sections 4.2, 4.3, 5 and 6; figure 2; tables 1, 3, 5; 16 pages.
Andrei Paleyes et al., "Challenges in Deploying Machine Learning: a Survey of Case Studies", arxiv.org, Cornell University Library, 201 Olin Library Cornell University Ithaca, NY 14853, Jan. 18, 2021 (Jan. 18, 2021), XP081860842, Sections 2-6; 21 pages.
International Search Report dated May 25, 2022, PCT/US2022/014769, filed Feb. 1, 2022; 3 pages.
Written Opinion of the International Searching Authority dated May 25, 2022, PCT/US2022/014769, filed Feb. 1, 2022; 8 pages.

\* cited by examiner

SYSTEMS AND METHODS FOR MANAGING, DISTRIBUTING AND DEPLOYING A RECURSIVE DECISIONING SYSTEM BASED ON CONTINUOUSLY UPDATING MACHINE LEARNING MODELS

CROSS-REFERENCE TO RELATED APPLICATIONS

This application claims the priority benefit of U.S. Provisional Patent Application No. 63/146,484, filed on Feb. 5, 2021, the disclosures of which are incorporated by reference herein.

FIELD

The present disclosure relates generally to systems and methods for the generation and deployment of a machine learning-enabled decision engine (MLDE). More specifically, techniques are provided for setting up and automating software based decisioning using machine learning models and artificial intelligence.

SUMMARY

Disclosed embodiments provide a framework for generating and deploying machine learning-enabled decision engines (MLDEs) that implement machine learning models and artificial intelligence that can be dynamically and automatically updated in real-time as users interact with the MLDEs. According to some embodiments, a computer-implemented method is provided. The computer-implemented method comprises receiving a request to generate a MLDE. The request defines one or more decision options, a set of data inputs, and a set of performance metric goals. The computer-implemented method further comprises identifying influencing data and performance metrics for the MLDE. The influencing data and the performance metrics are identified based on the set of data inputs and the set of performance metric goals. The computer-implemented method further comprises generating a predictive model. The predictive model is generated using the influencing data as a set of features for the predictive model. Further, the performance metrics are used as targets for the predictive model. The computer-implemented method further comprises receiving a set of controls to limit decision making of the MLDE. The set of controls are used to limit the one or more decision options. The computer-implemented method further comprises validating the MLDE. The computer-implemented method further comprises making the MLDE available for execution of use cases to obtain decisions and performance data. The computer-implemented method further comprises retraining the predictive model. The predictive model is retrained using an updated dataset generated based on the decisions and the performance data.

In some embodiments, making the MLDE available for execution includes converting the MLDE into a microservice. The microservice is accessible via one or more application programming interfaces (APIs).

In some embodiments, the computer-implemented method further comprises generating a synthetic dataset. The synthetic dataset is generated using the updated dataset as input to a generator configured to apply predefined rules corresponding to probabilistic relationships among various fields of the updated dataset. The computer-implemented method further comprises providing the synthetic dataset for use in generating new MLDEs.

In some embodiments, the set of controls are based on conditional statements associated with specific influencing attributes and corresponding rules.

In some embodiments, making the MLDE available for execution includes publishing a template corresponding to the MLDE to a marketplace.

In some embodiments, validating the MLDE includes applying one or more heuristics to the MLDE. The one or more heuristics are configured to determine whether the MLDE complies with the set of controls.

In some embodiments, the computer-implemented method further comprises generating a ranked list of decision options (RLDO) for generating the decisions. The RLDO is generated based on the set of controls.

In an example, a system comprises one or more processors and memory including instructions that, as a result of being executed by the one or more processors, cause the system to perform the processes described herein. In another example, a non-transitory computer-readable storage medium stores thereon executable instructions that, as a result of being executed by one or more processors of a computer system, cause the computer system to perform the processes described herein.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Illustrative embodiments are described in detail below with reference to the following figures.

Figure 1:
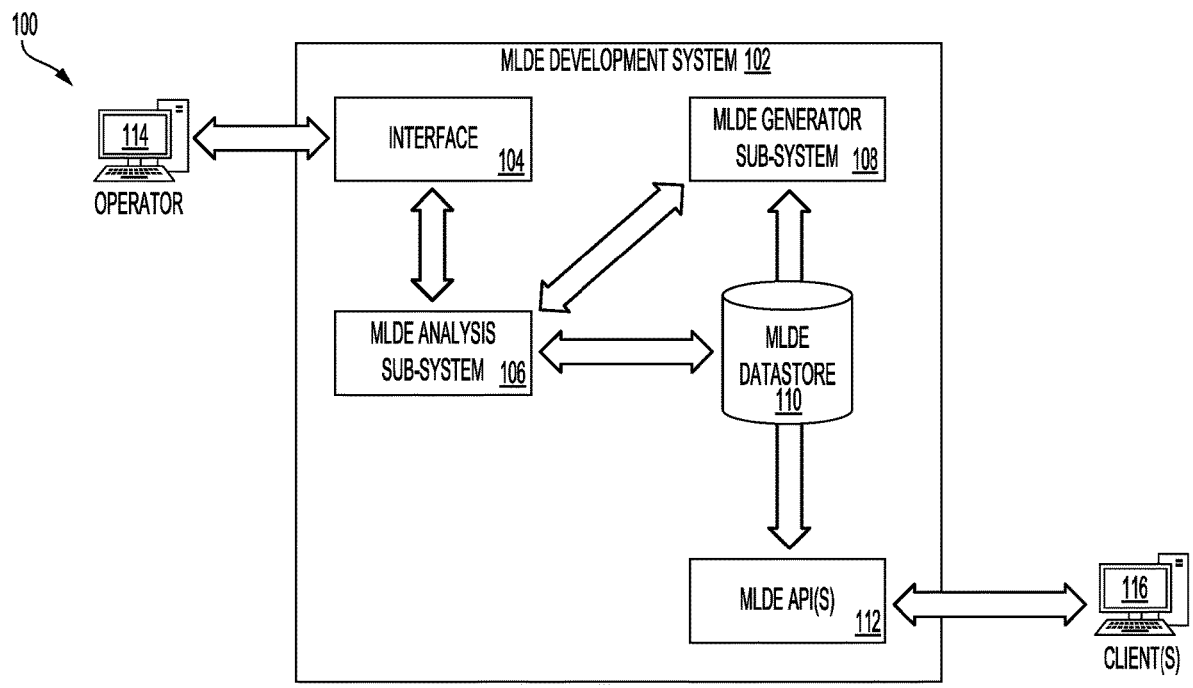
FIG. 1 shows an illustrative example of an environment in which a Machine Learning-Enabled Decisioning Engine (MLDE) development system can facilitate the building of a MLDE in accordance with various embodiments.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

There is a need in the art for methods of deploying a recursive decisioning system. The systems and methods described herein address this need and others by providing a computer system that can allow a human operator (e.g., a user of a Machine Learning-Enabled Decisioning Engine (MLDE) development system), to setup and automate software based decisioning using machine learning models and artificial intelligence. This human operator should not be confused with an end-user or other users who may interact with an MLDE, but are not responsible for building or managing the MLDE.

Each MLDE can include one or more components. In some implementations, an MLDE can include a Decision Options component. The Decision Options component can include a discrete list of one or more selectable decision options (e.g., a discrete list of items or specific number among a continuous range (with min/max) that can be returned as decisions by the MLDE).

In addition to a Decision Options component, an MLDE may further include various data inputs, which may include different data fields that can be used to influence the decision generated by the MLDE. The data inputs, in some implementations, can include metadata identifying various different data elements, sources, and/or variables that can be used to build machine learning models/artificial intelligence and to make predictions. These machine learning models/artificial intelligence and predictions may be used for the purpose of enabling the MLDE to make a decision based on provided data. For instance, in some implementations, one or more machine learning models and/or artificial intelligence can use the data inputs to predict one or more outcomes, which can be used to evaluate and improve upon the one or more machine learning models and/or artificial intelligence.

In some implementations, the MLDE development system maintains data corresponding to the decision used by the MLDE from the decision options presented. Additionally, different data input types can be used. For example, input corresponding to a specific decision can be associated with a specific decision from the set of decision options returned by the MLDE. In another example, input corresponding to a selection of a performance metric can used by an MLDE for decision making. For example, a performance selection can be used to improve one or more performance metrics (e.g., as determined automatically or as specified by an human operator). In some implementations, a data inputs component of the MLDE can include one or more different data fields that can be used to influence a decision. For example, a set of metadata can be used by the MLDE to influence a decision. In some implementations, when building machine learning models and artificial intelligence, the influencer data type can become machine learning modeling and artificial intelligence features themselves or the basis of engineered machine learning modeling and artificial intelligence features.

In some implementations, an MLDE can also include one or more controls, which can overlay and bound the decisioning within guidelines (e.g., as established by a human operator). The one or more controls may define bounds or constraints on the machine learning models and artificial intelligence generated by the MLDE for determining the best possible decisions from the various decision options using corresponding data inputs.

Once the MLDE is established, it can be validated with, for example, a set of heuristics that can ensure that the MLDE is both compliant and functional. A validated MLDE can be deployed to a computer server and used by one or more software applications (e.g., to make decisions). In some implementations, the MLDE can function by using data inputs to generate prediction models, that in turn are used to determine the best possible decision from the decision options, subject to the controls that are set in place for that MLDE. Additionally, the MLDE can run recursively and update the models as the MLDE receives new data over time, allowing the MLDE to improve an ability to make decisions.

FIG. 1 shows an illustrative example of an environment 100 in which a Machine Learning-Enabled Decisioning Engine (MLDE) development system 102 can facilitate the building of a MLDE in accordance with various embodiments. In the environment 100, an operator 114 interacts with an interface 104 of an MLDE development system 102 to create a new MLDE. The operator 114 may access the interface 104 via an application on the operator's computing device (e.g., application made available by the MLDE development system 102) or via a web browser. The interface 104, in some instances, may be implemented as a graphical user interface (GUI), through which the operator 114 may build an MLDE.

Through the interface 104, the operator 114 can submit initial MLDE labels, descriptions, and identifiers. The interface 104 may provide these labels, descriptions, and identifiers to an MLDE analysis sub-system 106, which may store these within an MLDE datastore 110. The MLDE analysis sub-system 106 may serve as a backend middle layer and database for the MLDE development system 102. The MLDE analysis sub-system 106 may be implemented on a computing system or as an application or process executing on a computing system of the MLDE development system 102.

Once the MLDE analysis sub-system 106 has stored the initial MLDE labels, descriptions, and identifiers in the MLDE datastore 110, the operator 114 can define one or more decision options of the MLDE. For instance, the operator 114 can define these decision options manually via the interface 104. Alternatively, the operator 114 can define these decision options via connection to an existing decision options data source, which can be either static or dynamic (e.g., database, application programming interface (API), data table, etc.). The MLDE analysis sub-system 106 may validate these decision options and store these as a set of attributes of the MLDE in the MLDE datastore 110. These decision options may also include decision option attributes, which may include metadata that is associated with the decision options. The decision option attributes may be used for machine learning modeling and artificial intelligence generation, as described herein. As an illustrative, but non-limiting, example, an MLDE may be configured to automatically determine what content to show to a user based on a profile and behavioral data associated with a user. Each form of content that may be showed to the user may represent a decision option for the MLDE. Further, a form of content that may be presented to the user may be associated with a particular category, price, discount, color, or classification, which may represent a decision option attribute for the content that may be showed to the customer.

The operator 114, via the interface 104, can further define the data inputs of the MLDE. Similar to the decision options described above, the operator 114 can define these data inputs manually or via a connection to an existing data inputs source (e.g., database, API, data table, etc.). If the operator 114 has defined the data inputs from a dataset, the MLDE analysis sub-system 106 may validate and store this dataset in the MLDE datastore 110, where the MLDE generator sub-system 108 may create the MLDE dataset for storage in the MLDE datastore 110. The MLDE generator sub-system 108 may be implemented on a computing system or as an application or process executing on a computing system of the MLDE development system 102.

In an embodiment, the operator can further set the various data inputs provided via the interface 104 as being "influencing," "resulting decision," or "performance metrics." Influencing data inputs may include data inputs that are used to influence an MLDE's decisioning. For instance, influencing data inputs may correspond to characteristics associated with a user (e.g., age, gender, ethnicity, location, etc.), characteristics associated with a computing device utilized by the user (e.g., operating system, available memory, processor specifications, etc.), environmental characteristics (e.g., time of day, temperature, weather, etc.), and the like. The influencing data points may correspond to data points that may be known prior to use of the MLDE to generate a particular decision or output. Performance metric data inputs may include data inputs that help to align goals (e.g., between the MLDE and the operator 114). Resulting decision data points may correspond to prior decisions made by users based on the decision options presented to these users. For example, the resulting decision data points may correspond to feedback provided by users with regard to options or other output provided to these users based on a set of characteristics corresponding to these users. As an illustrative, and non-limiting, example, for a particular set of influencing data corresponding to a user (e.g., age, gender, location, etc.) and corresponding output presented to the user, a resulting decision data point may correspond to the user's interaction with the presented output. For instance, if a female user, aged 34 and living in a suburban town, is presented with an advertisement banner for women's apparel (as opposed to other types of advertisement banners), a resulting decision data point may correspond to whether the female user has selected the advertisement banner, dismissed the advertisement banner, and the like. Once the operator 114 sets the data inputs according to the aforementioned categories, the MLDE analysis sub-system 106 may validate and store the data inputs with their proper identification and relationship to a pre-existing dataset (if one exists) in the MLDE datastore 110.

In addition to defining and categorizing data inputs for creation of an MLDE, the operator 114 may further set performance metric goals. A performance metric goal can be represented as a number, a range of numbers, or as a Boolean (1,0). For example, if the performance metric is "average order value" (a commonly used ecommerce metric), an operator 114 can define a performance metric goal whereby an MLDE is to make decisions that increase the "average order value". In some embodiments, an MLDE can have multiple performance metrics and can be designed to optimize among a set of the performance metrics, (e.g., to facilitate an opportunity for balanced and multi-strategy optimizations) according to the defined performance metric goals.

In some implementations, based on the data inputs provided by the operator 114, the MLDE analysis sub-system 106 can establish the elements of a predictive machine learning model or artificial intelligence using the data inputs categorized as being "influencing." For instance, the MLDE analysis sub-system 106 may use these data inputs as features in a machine learning model or artificial intelligence, while trying to predict a performance metric as the target according to the data inputs provided by the operator 114. The MLDE analysis sub-system 106 may transmit the elements of the predictive machine learning model or artificial intelligence to the MLDE generator sub-system 108. The MLDE generator sub-system 108 may build the predictive model or artificial intelligence based on the data inputs and any pre-associated datasets from the MLDE datastore 110. Further, the MLDE generator sub-system 108 may build the predictive model given model engines maintained by the MLDE generator sub-system 108.

In some implementations, the MLDE generator sub-system 108 can generate and the MLDE analysis sub-system 106 can evaluate different predictive models given the model engines maintained by the MLDE generator sub-system 108 in order to identify and select a predictive model for the MLDE. For instance, based on the data inputs provided by the operator 114, the MLDE analysis sub-system 106 may automatically predict a performance metric that may be used to evaluate each of the different predictive models generated by the MLDE generator sub-system 108. As noted above, an operator 114 may define one or more performance metric goals, which can be represented as numbers, ranges of numbers, or as Booleans (1,0). The MLDE analysis sub-system 106 may use these one or more performance metric goals to predict the performance metric that may be used to evaluate each of the different predictive models generated by the MLDE generator sub-system 108 based on the data inputs provided by the operator 114.

In some implementations, the MLDE generator sub-system 108 can use one or more automated machine learning (AutoML) systems to generate a plurality of different predictive models that may be evaluated according to the one or more performance metric goals and data inputs provided by an operator 114 to select a predictive model for the MLDE. These one or more AutoML systems may incorporate various libraries that correspond to different types of machine learning models that may leveraged to generate predictive models according to the one or more performance metric goals and data inputs provided by an operator 114. For instance, the one or more AutoML systems may use recurrent neural networks (RNN), convoluted neural networks (CNN), long short-term memory (LSTM), k-means clustering algorithms, fuzzy c-means (FCM) algorithms, expectation-maximization (EM) algorithms, hierarchical clustering algorithms, density-based spatial clustering of applications with noise (DBSCAN) algorithms, genetic algorithms, backpropagation, reinforcement learning, decision trees, linear classification, anomaly detection, and the like.

The MLDE analysis sub-system 106, in some implementations, can evaluate each of the predictive models generated by the AutoML systems to calculate a performance metric for each of these predictive models. As an illustrative, but non-limiting, example, for each predictive model generated by the AutoML, the MLDE analysis sub-system 106 may calculate the root mean squared error (RMSE) of the predictive model between the outputs generated by the predictive model for a given set of data inputs and the expected outputs (e.g., resulting predictions) for the given set of data inputs. Based on the RMSE values for the set of predictive models generated by the AutoML systems, the MLDE analysis sub-system 106 may select the predictive model having the lowest RMSE value, as this predictive model may have the greatest level of accuracy compared to the other predictive models of the set. It should be noted that while RMSE is used throughout the present disclosure for the purpose of illustration, other performance metrics may be used to evaluate the predictive models generated by the AutoML systems and to select a predictive model that provides the greatest level of accuracy compared to the other predictive models of the set. For instance, the MLDE analysis sub-system 106 may calculate other performance metrics such as a coefficient of determination (e.g., R-squared), mean absolute error (MAE), relative absolute error (RAE), mean squared error (MSE), normalized root mean squared error (Norm RMSE), relative root mean squared error (RRMSE), or any other performance metric that may be used to evaluate the accuracy and performance of the predictive models generated by the AutoML systems.

Based on the performance of the selected model, the MLDE analysis sub-system 106 may update various statistics associated with the model's performance. These statistics may include the number of training and testing records resulting from the performance and evaluation of the model, as well as other model details (e.g., predictability, field data weighting, variance, etc.). The MLDE analysis sub-system 106 may make these statistics available to the operator 114 via the interface 104. For instance, using a GUI provided by the MLDE development system 102, the operator 114 may access the various model performance and predictability statistics generated by the MLDE analysis sub-system 106.

In some implementations, the operator 114 can use the interface 104 to set one or more controls for the MLDE. The one or more controls may specify limits to the decision making of the MLDE based on the various data inputs provided by the operator 114. The MLDE analysis sub-system 106 may validate and store any specific controls that will limit the MLDE decision options, storing these controls in the MLDE datastore 110.

Once the controls have been set, the operator 114, via the interface 104, can submit a request to initiate validation of the MLDE. In response to the request, the MLDE analysis sub-system 106 may update the MLDE information and pass this updated information to the MLDE generator sub-system 108, which may transform the MLDE into a microservice that receives "influencing" data and returns one or more decisions, as described in greater detail in FIG. 3. The MLDE generator sub-system 108 may make this new microservice available via a set of MLDE APIs 112. For example, the MLDE generator sub-system 108 may make the MLDE microservice available as a GET API to return decision options as a discrete list of items or specific number among a continuous range (with min/max) that can be returned as decisions.

In some implementations, a client 116 can submit a request to obtain a decision from an MLDE by passing influencing data via the GET API. For instance, a client 116, via a software application configured to rely on an MLDE, may submit the influencing data using the GET API. This may cause the MLDE to use the provided influencing data to return the one or more decisions. The MLDE may pass these decisions to the client 116, which may adjust its experience accordingly. In some instances, the client 116 may execute its use cases based on the decisions from the MLDE and posts the results to the MLDE. For instance, the MLDE generator sub-system 108 may make available an MLDE microservice via the set of MLDE APIs 112 as a POST API. The POST API may be made available to allow the MLDE generator sub-system 108 to receive the resulting used decision and performance data from the client 116.

The MLDE generator sub-system 108 may use the performance data, used decision, and the decision options provided to the client 116 to dynamically update the MLDE dataset. For instance, as various clients submit requests to obtain decisions from the MLDE, the MLDE generator sub-system 108 may, in real-time, process the performance data, used decisions, and decision options provided to these clients in order to update the MLDE dataset. This may allow for the MLDE generator sub-system 108 to process data corresponding to various and simultaneous client requests as the data is received. In some implementations, the MLDE generator sub-system 108 uses the updated MLDE dataset to dynamically and in real-time retrain the model associated with the MLDE. For instance, as the MLDE dataset is being dynamically updated in real-time according to the client requests being processed using the MLDE, the MLDE generator sub-system 108 may automatically, and in real-time, use the dynamically updated MLDE dataset to continuously retrain the model associated with the MLDE. Based on the performance of the model and the MLDE using the updated dataset, the MLDE generator sub-system 108 may obtain updated statistical performance data for the model and the MLDE. Further, the retrained model may be included in the MLDE microservice made available via the GET API to the client 116.

The MLDE generator sub-system 108 may provide the updated statistical performance data to the MLDE analysis sub-system 106, which may update the MLDE information to include the updated statistical performance data. The MLDE generator sub-system 108 may further indicate, based on the statistical performance data, how the MLDE performed according to the various learning metrics and performance metrics goals set forth by the operator 114 via the interface 104, as described above. The MLDE generator sub-system 108 may provide the MLDE information to the operator 114 via a performance dashboard presented to the operator 114 via the interface 104. Through this performance dashboard, an operator 114 may see the individual performance of each of its MLDEs and make any adjustments as deemed necessary.

In some implementations, the MLDE analysis sub-system 106 can use the updated MLDE dataset to determine whether the predictive model associated with the MLDE provides the best performance compared to the other predictive models previously generated by the AutoML systems and evaluated by the MLDE analysis sub-system 106. For instance, the MLDE analysis sub-system 106 may use the updated MLDE dataset to evaluate each of the predictive models generated by the AutoML systems and to calculate a new performance metric for each of these predictive models. Based on this new performance metric, the MLDE analysis sub-system 106 may determine whether the predictive model associated with the MLDE is still providing the best performance according to the performance metrics goals specified by the operator 114. If the predictive model associated with the MLDE provides the best performance, the MLDE analysis sub-system 106 may provide an indication to the MLDE generator sub-system 108 to continue to associate the predictive model with the MLDE. Alternatively, if the MLDE analysis sub-system 106 determines, based on the updated MLDE dataset and the performance metrics goals specified by the operator 114, that a different predictive model would outperform the present predictive model associated with the MLDE, the MLDE analysis sub-system 106 may provide a notification to the MLDE generator sub-system 108 indicating the different predictive model that is to be associated with the MLDE. Accordingly, the MLDE generator sub-system 108 may associate this different predictive model with the MLDE for future implementations and uses of the MLDE.

In some implementations, the MLDE analysis sub-system 106 can transmit a request to the MLDE generator sub-system 108 to use the one or more AutoML systems to generate a new set of predictive models that may be evaluated according to the one or more performance metric goals and the updated MLDE dataset in order to select a new predictive model that can be compared to the predictive model that is associated with the MLDE. The MLDE analysis sub-system 106 may evaluate and calculate a performance metric for each of these new predictive models in order to select a predictive model that may serve as a challenger to the predictive model currently associated with the MLDE. Additionally, the MLDE analysis sub-system 106 may evaluate the predictive model currently associated with the MLDE using the updated dataset to calculate a new performance metric for this predictive model. The MLDE analysis sub-system 106 may compare the performance and accuracy of the selected predictive model (e.g., the challenger) and the predictive model associated with the MLDE according to the performance metric in order to determine whether the selected predictive model outperforms the predictive model associated with the MLDE. If so, the MLDE analysis sub-system 106 may associate the selected predictive model with the MLDE for future implementations and uses of the MLDE. However, if the selected predictive model does not outperform the current predictive model associated with the MLDE, the MLDE analysis sub-system 106 may maintain the association between the current predictive model and the MLDE, discarding the new predictive model selected to challenge the current predictive model. This iterative process may be performed in real-time as the MLDE dataset is being dynamically updated.

Figure 2A:
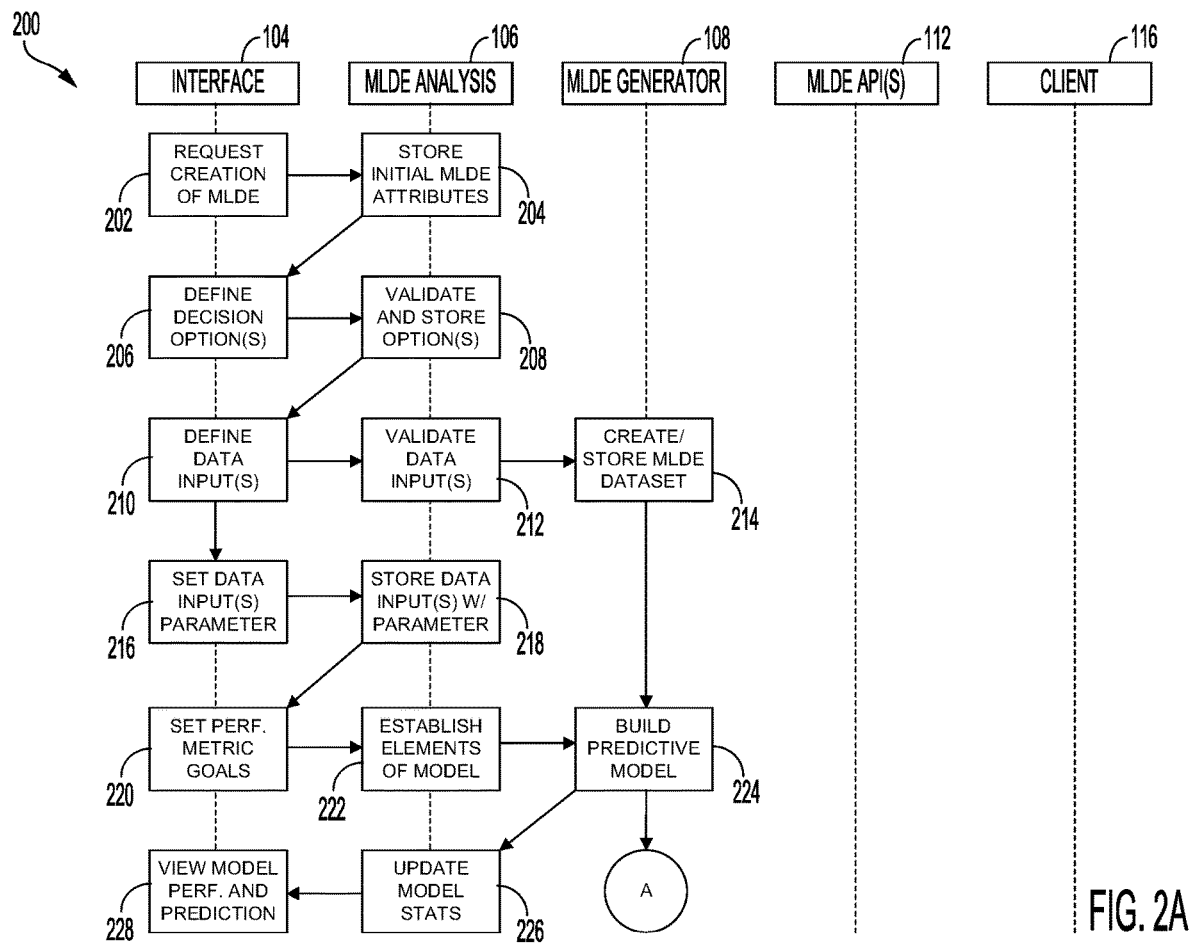
FIGS. 2A-2B show an illustrative example of a flow diagram for a method for creating an MLDE and evaluating the performance of the MLDE in accordance with at least one embodiment.
Figure 2B:
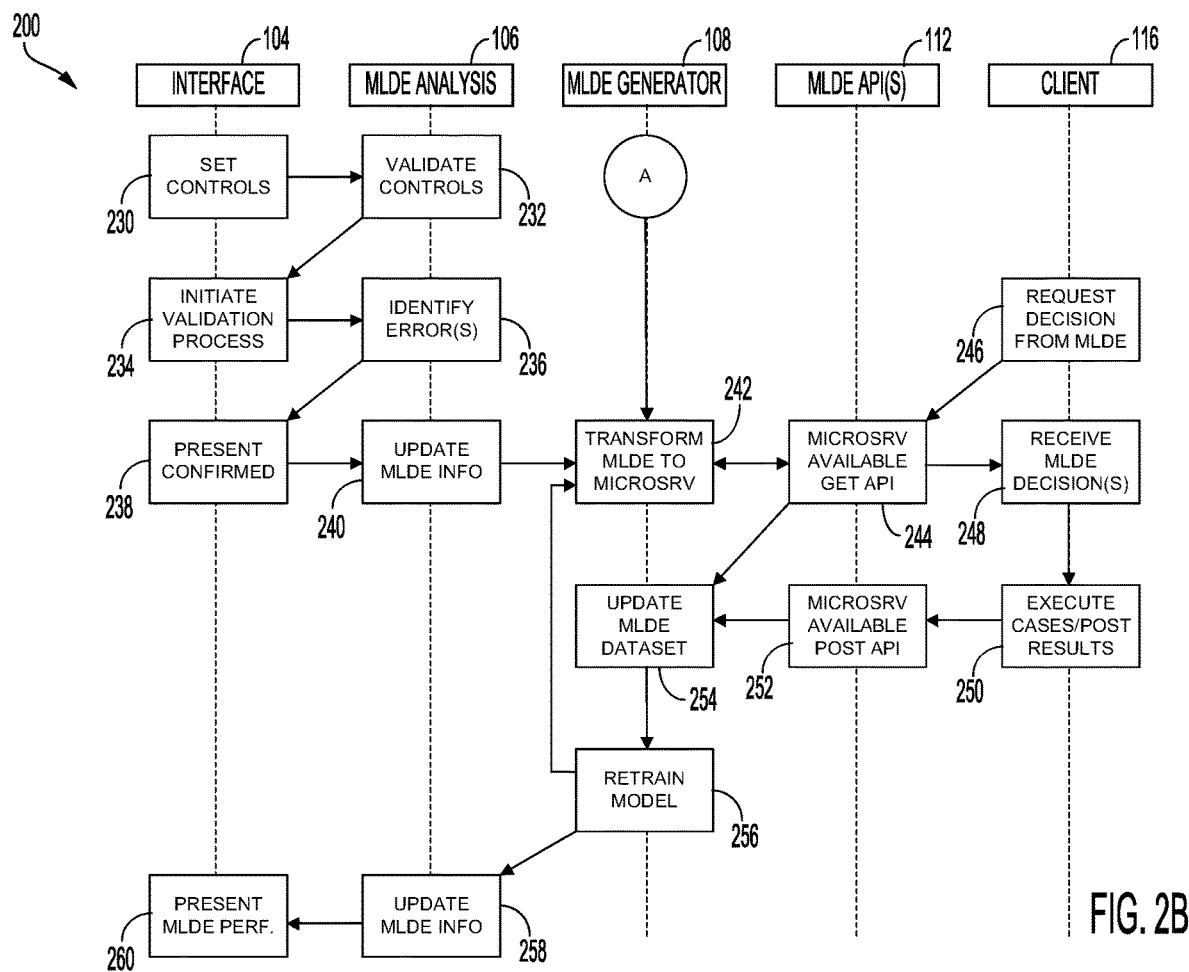

FIGS. 2A-2B show an illustrative example of a flow diagram 200 for a method for creating an MLDE and evaluating the performance of the MLDE in accordance with at least one embodiment. In some implementations, an MLDE can be generated 202 in response to an operator request via the interface 104 of the MLDE development system. In these implementations, an MLDE can be instantiated, for example, by setting an initial set of parameters, which can include a label, one or more descriptions, and other initializing information. The MLDE analysis sub-system 106 can respond by validating and storing 204 the information. In some implementations, the validations can be used to ensure that there are no duplicate MLDE names.

In some implementations, an operator can define 206 a set of Decision Options associated with the MLDE. In these implementations, the system can guide the user into determining and selecting one or more Decision Options. For example, there can be two options for setting a list which can include a discrete list of items option, or a set numerical range option with a minimum and maximum value with an interval. In the case of a discrete list, each item uploaded can include a label and an identifier (which can also be used for computer lookups within databases or other data sources). Additionally, in some embodiments, Decision Options can be updated automatically or manually by using an API. As an illustrative, but non-limiting example, for an MLDE that is to be implemented in order to provide users with an advertisement carousel when these users visit a particular web page, an operator may define different decision options corresponding to different promotional advertisements that may be presented through the advertisement carousel. The predictive model associated with the MLDE may be configured to select, based on influencing data associated with a user, a particular promotional advertisement (e.g., decision option) that may be presented to the user when the user accesses the web page.

Once loaded into a graphical interface (e.g., using the API), the Decision Options can be validated 208 and stored by the MLDE analysis sub-system 106. In some embodiments, in order for an MLDE to begin to make decisions (e.g., choosing between one or more Decision Options), the MLDE will need more information in the form of additional Data Inputs. This information can be entered or defined 210 automatically or manually. For instance, the Data Inputs can be entered or defined manually 210 by the operator via the interface 104. The MLDE analysis sub-system 106 may validate 212 and store these data inputs as a new dataset in the MLDE datastore. In other embodiments, when an initial data source is a preexisting dataset, that preexisting dataset can be copied over directly and stored 214 as the dataset of the MLDE. In these embodiments, Data Inputs can be set either as custom data variables and attributes or can be loaded from another data source like a data table, database, API, or any other source of data or metadata.

In some implementations, the operator can determine or set 216 one or more forms of data inputs such as a decision input, an influencing input, or a performance metrics input. In these implementations, the initial setting can also represent the actual decision used by the software associated with the MLDE. For example, an MLDE can send a set of decision options, (e.g., red, green, and blue as the top color choices), and the MLDE can allow an operator to select a color to represent an initial setting. Once the operator selects a color option (e.g., red), the actual color used (in this case red) can be stored as the actual decision in the MLDE. In some embodiments, once all the data inputs are specified, the MLDE analysis sub-system 106 can validate and store 218 those data inputs and any association to pre-existing datasets in the MLDE.

As an illustrative example, an operator may wish to create an MLDE that may be used to automatically process loan applications in order to determine whether to accept, reject, or escalate the loan application for further review. The operator, through the interface provided by the MLDE development system, may define a set of influencing data points such as a credit score, any previous loans and corresponding parameters associated with these loans (e.g., loan amount, interest rate, repayment history, etc.), current bank balance, and the like. Additionally, the operator may define the different resulting decision data points corresponding to the influencing data points of the dataset. For example, for a business that has a low credit score, with a significant amount debt associated with a number of existing loans, the operator may define a resulting decision data point that indicates that the loan application from this business should be rejected. Additionally, the operator may define one or more controls to prevent undesirable outputs by the MLDE. For instance, the operator may define a control whereby a business having a credit score below a certain threshold amount (e.g., 550), the MLDE is to automatically recommend rejection of the business's loan application. The operator may further define one or more performance metric goals related to the likelihood of a business repaying a loan, the amount of time required by the business to pay back the loan, and the like. Based on these data inputs, the MLDE analysis sub-system 106 may validate and store these data inputs as a new dataset in the MLDE datastore for the creation of one or more predictive models that may be associated with a MLDE that is to be implemented to automatically process loan applications to determine whether to recommend acceptance, rejection, or further review of these loan applications.

As noted above, data inputs can also include performance metrics inputs which can be data inputs that may be used to align goals (e.g., between the MLDE and the user). A performance metric can be represented as a number, a range of numbers, or as a Boolean (1,0). For example, if the performance metric is "average order value" (a commonly used ecommerce metric), an operator can decide that they want an MLDE that makes decisions that increase the "average order value". In some embodiments, an MLDE can have multiple performance metrics and can be designed to optimize among a set of the performance metrics, (e.g., to facilitate an opportunity for balanced and multi-strategy optimizations).

In some implementations, in terms of machine learning modeling or artificial intelligence generation, performance metrics can be set 220 and may often be the "target" of a machine learning ("ML") prediction. In other implementations, the MLDE analysis sub-system 106 can establish 222 one or more elements of a predictive model using influencing metadata. This metadata can be used as the machine learning or artificial intelligence inputs (e.g., machine learning or artificial intelligence features), that can drive decision making. In these implementations, this metadata can be any type of classification, number, text, categorical, or taxonomical data. Additionally, the system can provide its insight into what will create an effective MLDE. For example, the system may recommend influencing data that it has learned is effective in specific MLDEs. In this example, the system will be using machine learning algorithms or artificial intelligence to recursively learn from the successful MLDEs.

Within the MLDE generator sub-system 108, all the information that has been collected can drive the creation of a set of predictive models 224. These predictive models will exist in the client containers because they will be directly interacting with the clients' data. This logical and possibly physical segregation plays a role in the data security for each client 116. The predictive models that use the real client data (stored in 214) to derive predictions are the inputs into a larger decision engine which are described in greater detail herein.

As noted above, the MLDE generator sub-system 108 can generate, and the MLDE analysis sub-system 106 can evaluate, different predictive models given the model engines maintained by the MLDE generator sub-system 108 in order to identify and select one or more predictive model for the MLDE. The MLDE generator sub-system 108 may use one or more AutoML systems to generate these different predictive models, which may be evaluated according to the one or more performance metric goals and using the data inputs provided by an operator 114 or otherwise obtained through the connection to an existing data inputs source (e.g., database, API, data table, etc.). The MLDE analysis sub-system 106 can evaluate each of these predictive models generated by the AutoML systems to calculate a performance metric for each of these predictive models. Based on the performance metrics for the set of predictive models generated by the AutoML systems, the MLDE analysis sub-system 106 may select one or more predictive models that may be associated with the MLDE.

When the MLDE analysis sub-system 106 is running continuously, it will update statistical information about the overall performance of the system 226. This statistical information pertains to the ML model statistics including the number of training and testing records as well as other model details like predictability and field data weighting or variance and other information commonly associated with ML models. The ML model statistics feeds the interface 104 to inform 228 the operator of the ML model performance, which is a component of the overall MLDE performance.

The operator can also set 230 their own controls that can be applied to the MLDE. Controls are functions that limit the scope of the decision making of the MLDE via the interface 104. For example, an operator may want to create an MLDE to determine what advertising promotion will be most effective for a consumer on a typical e-commerce site that has a wide variety of products, including alcoholic products. Assuming "age" is an influencing data input used in influencing the MLDE's decisioning, the system may choose that 19 yr old males are most receptive to a sports-based beer (alcohol) promotion. Given that this promotion is in the United States, where the minimum drinking age is 21, this would likely be illegal or at least ill advised. In this case the operator can set a control function whereby if the age of the consumer is less than 21, the MLDE is to exclude any advertising promotions associated with alcoholic products. This control function may be stored and validated as in 232 to ensure and limit the actual decision engine options.

Once all the MLDE parameters are complete, including any optional controls, the operator can initiate the validation process 234, and the MLDE analysis sub-system 106 can perform 236 the validation process. The validation may include use of a large set of heuristics that each MLDE must pass. The heuristics will analyze the data inputs, controls, dataset, and predictive models available to provide pass/fail statuses for each of these predictive models. Though it may be difficult to determine if an MLDE will be successful, this determination may be improved by highlighting any failed heuristics and displaying them to the operator in 238 via the interface 104. An example of a heuristic would be "Are there mutually exclusive controls that reduce all or some options?" In this example, a decision option may include the color blue and the operator sets two controls for a data input corresponding to age. A heuristic may be defined whereby if a user's age is less than 20, the decision option corresponding to the color blue is to be excluded and where if a user's age is equal to or greater than 20, the decision option corresponding to the color blue is also to be excluded. This is an example of a failed heuristic because the decision option corresponding to the color blue would always be excluded. If this is the operator's intent, the decision option corresponding to the color blue should be removed from the set of decision options all together, as the color blue would never be presented to a user. Another example of a heuristic could be associated with the dataset. For instance, if the dataset is too small or incompatible with building a good predictive ML model, the MLDE analysis sub-system 106 would inform the operator that the dataset does not meet a passing standard for the MLDE. If the MLDE does pass the validation heuristics, it will then be marked 240 as usable within the system, at which point the operator can start using that MLDE in externally facing applications. In the event the MLDE cannot pass the heuristic surrounding the dataset or the ML model based on the dataset, the MLDE can still be launched in Learning Mode (as described in greater detail herein in connection with FIG. 3).

Using the MLDE includes transforming 242 the MLDE from a set of parameters and ML models into a microservice. A microservice serves as the backend for an API that can take on the data inputs and return the decision based on the logic of the decision engine (as described in greater detail herein in connection with FIG. 4). The APIs 112 for an MLDE may include two specific APIs: the GET API 244 and the POST API 252. The client 116 (such as through a client software application) will call 246 the GET API. The GET API may include, as inputs, the aforementioned influencing data inputs. The GET API will return the decision, which the client 116 may receive 248. The MLDE generator sub-system 108 will also automatically, and in real-time, store the actual data from the GET API and the decision returned in the MLDE's dataset 254, as provided by the client 116. The consumer application will then use the decision returned, typically in the user interface or the consumer application, to execute its use cases and post its results 250. As an example, if the MLDE is deciding which advertising promotion to show a user in the consumer application, it will return the promotion or an ordered list of promotions. Those advertising promotions will be displayed in the client facing application. Then the client will select a promotion and continue along their consumer journey.

It should be noted that the microservice may function to simultaneously process GET API calls from various clients in real-time to dynamically provide individual decisions to each of these clients based on their corresponding inputs. For example, the microservice may simultaneously process thousands of GET API calls from different clients that may be using different copies or instances of the client software application. As an illustrative example, many different clients may each have installed the particular client software application, through which any of these clients may submit a GET API call to the microservice to obtain a decision. Accordingly, multiple GET API calls may be transmitted from the different instances of the client software application, which may be processed in real-time by the microservice as the GET API calls are received.

Once a user performs their action, on the client's user facing application, the client 116 will invoke the POST API 252. The purpose of the POST API is to capture what actually happened. In the example above, this may include the actual selection of consumer advertising and a determination as to whether the selection led to a sale or an abandoned cart. Much like the GET API, the POST API will also update the dataset 254 for that MLDE and it will do so specific to each MLDE event. This means the dataset captures the "cause and effect" data required for valuable machine learning.

Similar to the simultaneous and real-time processing of various GET APIs from myriad clients, the microservice may simultaneously, and in real-time, process POST APIs from these myriad clients in order to dynamically update the dataset for the MLDE for each specific MLDE event. For example, the microservice may simultaneously process thousands of POST API calls from different clients that may be using different copies or instances of the client software application. As noted above, many different clients may each have installed the particular client software application, through which any of these clients may submit a POST API call to the microservice to provide the corresponding consumer's selection (e.g., decision) based on the decision option selected by the MLDE and presented to the consumer. Accordingly, multiple POST API calls may be transmitted from the different instances of the client software application, which may be processed in real-time by the microservice as the POST API calls are received. Further, because the POST API calls are processed in real-time as they are received, the dataset for the MLDE may also be dynamically updated in real-time.

As the dataset is updated 254 in real-time, a recursive process 256 for building new models and driving more accurate predictions occurs periodically, typically within a 24-hour period. However, this frequency can and should be a function of the data volume. For instance, for high volume, fast moving datasets, the recursive process for building new models and driving more accurate predictions may be performed more often and at a greater frequency. Alternatively, for slow moving datasets, the recursive process for building new models and driving more accurate predictions may be performed at a lesser frequency. The ability for the system to be continuously learning will set it apart from the relatively static ML implementations, where data scientists work to generate single model and do not constantly evolve.

The MLDE and its components may constantly, in real-time, be collecting statistical data on their performance 258. This data is used to provide 260 an overall status and health of the MLDE to the operator via the interface 104. The operator will see if the MLDE performance is improving or worsening. The MLDE health is a composite score of the statistics collected about the MLDE including its ML Models and its ability to continue to pass or fail the heuristic from the validation process noted above.

Training or Learning Mode Description

Figure 3A:
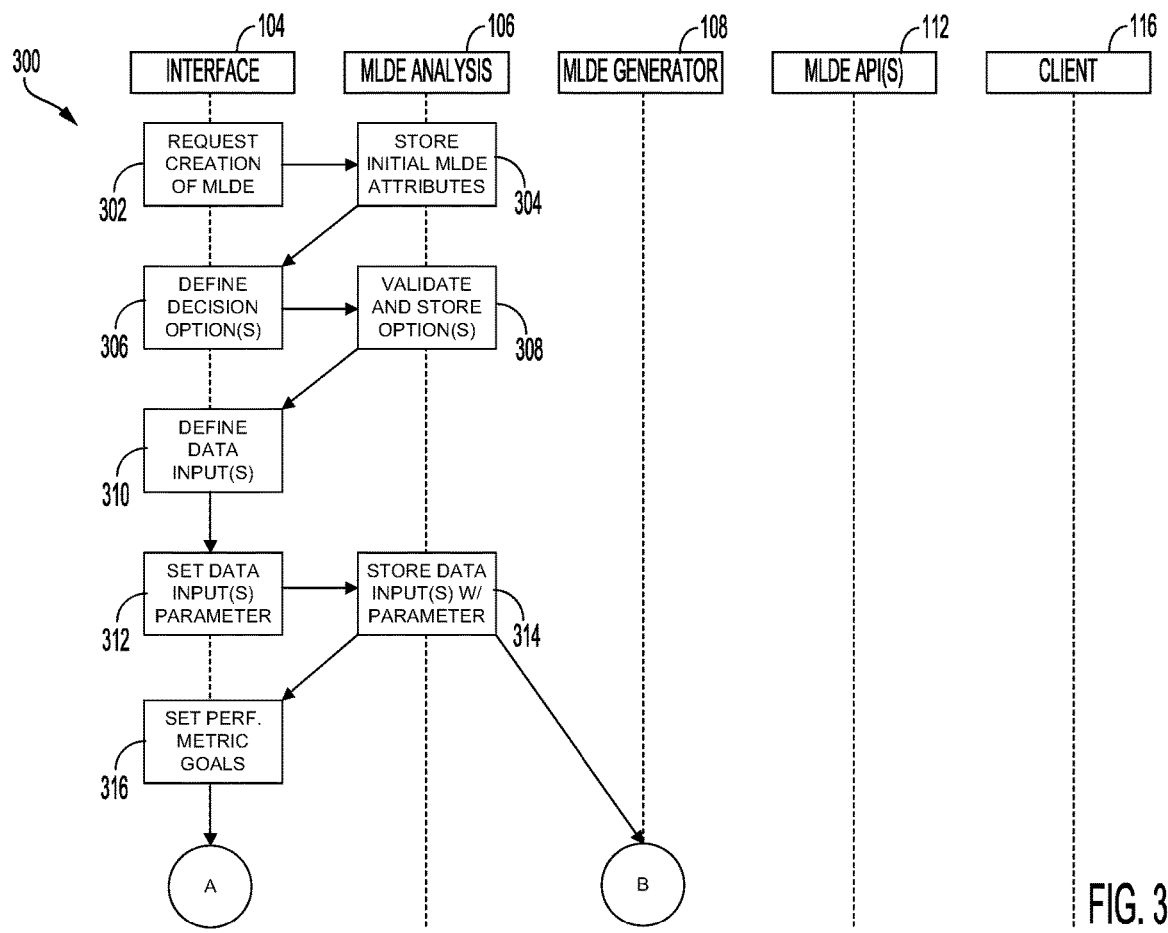
FIGS. 3A-3B shows an illustrative example of a flow diagram for generating an MLDE that is designed to learn from real data then automatically turn on after it reaches a preset confidence threshold in accordance with at least one embodiment.
Figure 3B:
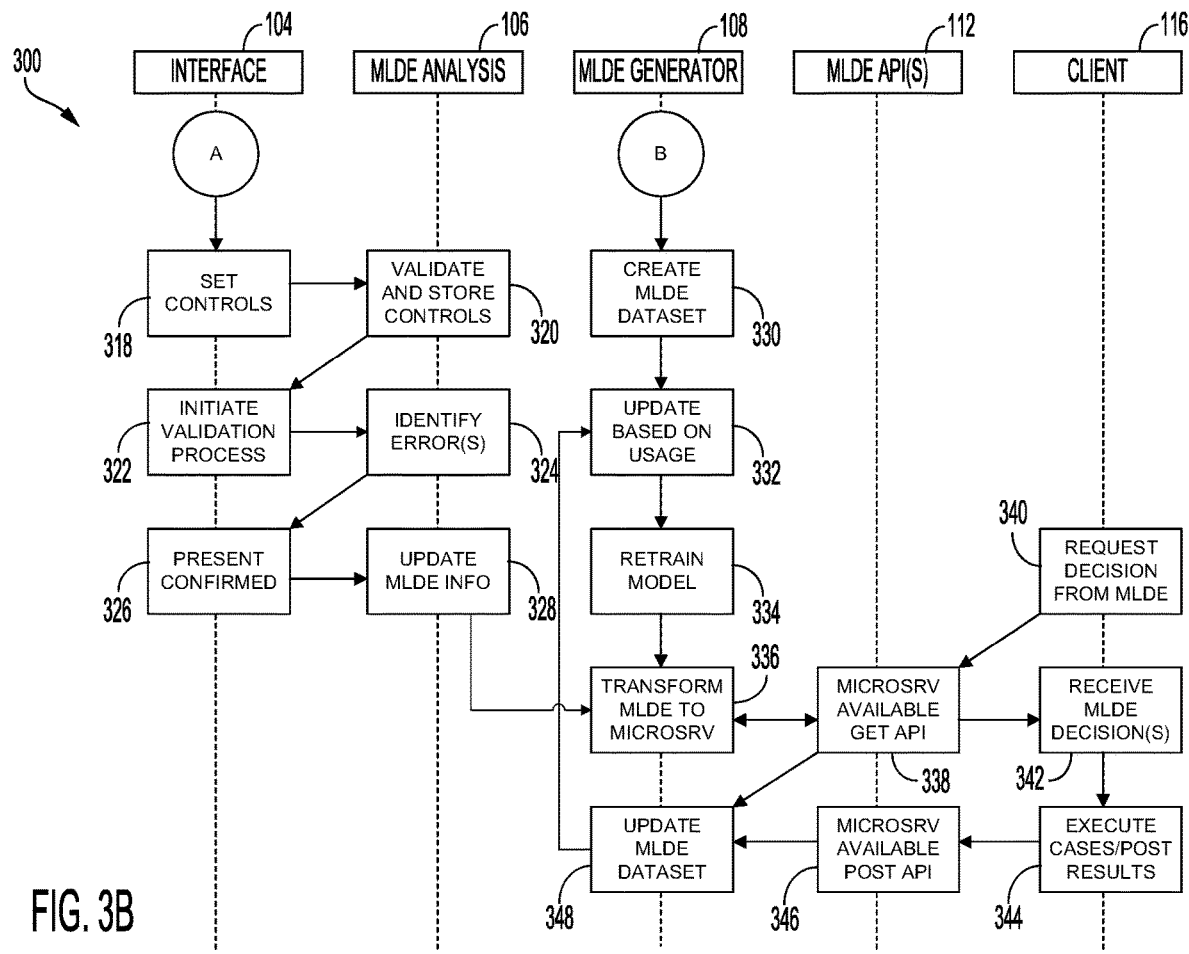

In the event an operator would like to build an MLDE, where there is no pre-existing datasets to use to train ML models, the operator can build an MLDE that is designed to learn from real data then automatically turn on after it reaches a preset confidence threshold. This MLDE will be functional, in that it will still provide decisions, per the decision engine (as described in greater detail herein). The decisions will not be based on ML models making predictions until the confidence threshold has been met. The MLDE will use the default settings and responses the operator established in the MLDE as well as any controls the user put in place. FIGS. 3A-3B show an illustrative example of a flow diagram 300 for generating an MLDE that is designed to learn from real data and automatically turn on after it reaches a preset confidence threshold in accordance with at least one embodiment. Other than the MLDE not having pre-existing data, all other components of the MLDE will be identical to the description as provided above.

Building the Learning Model (LM) MLDEs may follow the same general process as described above in the overall description of the MLDE. The initial steps 302, 304, 306, 308, and 310 may mirror the standard MLDE creation process related to steps 202 to 210 described above in connection with FIGS. 2A-2B. In this context everything may be identical—including the creation of the manually entered decision options.

A LM-MLDE may branch away from the standard MLDE process as the next few steps are abbreviated. For instance, there is no need to load a data source with a preexisting dataset. Thus, at step 312, the operator may manually define the data inputs via the interface 104. As such these data inputs (e.g., decision inputs, performance inputs, and influencing inputs) are metadata labels and don't have any underlying datasets. The MLDE analysis sub-system 106 will store and validate 314 these metadata labels so that future datasets will have the prelabeled column headers.

Just like in a standard MLDE, in terms of machine learning modeling or artificial intelligence generation, performance metrics can be set 316 via the interface 104 and may often be the "target" of a machine-learning ("ML") prediction. In order to successfully drive the learning in the right direction—additional instructions can be given in the form of weighting and direction—determinations are made as to whether to increase or decrease the performance metric and how much weight each metric should get. For example, an MLDE can have goal of both increasing Average Order Value (AOV) while decreasing the Percent of Cart Abandonment. These are two common performance metrics in ecommerce where in one case success is defined as increasing AOV and in the other case success is described as decreasing the Percent of Cart Abandonment.

Just like in the standard MLDE, in the LM MLDE, the operator can also set 318 their own controls that can be applied to the MLDE. Controls are functions that limit the scope of the decision making of the MLDE. The MLDE analysis sub-system 106 can still run the validation processes 320 and 324 for an LM MLDE. For instance, the MLDE analysis sub-system 106 may validate and store the controls 320. Further, when the operator initiates 322 a validation process via the interface 104, the MLDE analysis sub-system 106 may utilize one or more heuristics to identify 324 any errors. This is a vastly simplified validation process as it does not have the benefit of preexisting data. This will only Validate that the Controls or conforming and the metadata types of Data Inputs are consistent.

Once the LM MLDE is complete (e.g., the operator is presented with a confirmation that the MLDE is considered ready for use 326), the LM MLDE is ready to be published for use. In this respect it looks similar to the standard MLDE in usage with one large exception. The MLDE in 328 will not be using ML models as part of its decision engines. It may rely on its default decision and controls that may be in place. The subsequent steps 330 through 348 may be similar to steps described above in connection with FIG. 2. Once ML models reach the required confidence/predictability threshold, the LM MLDE will actually turn on its full scope decisioning, becoming a standard MLDE.

Decision Engine

Figure 4:
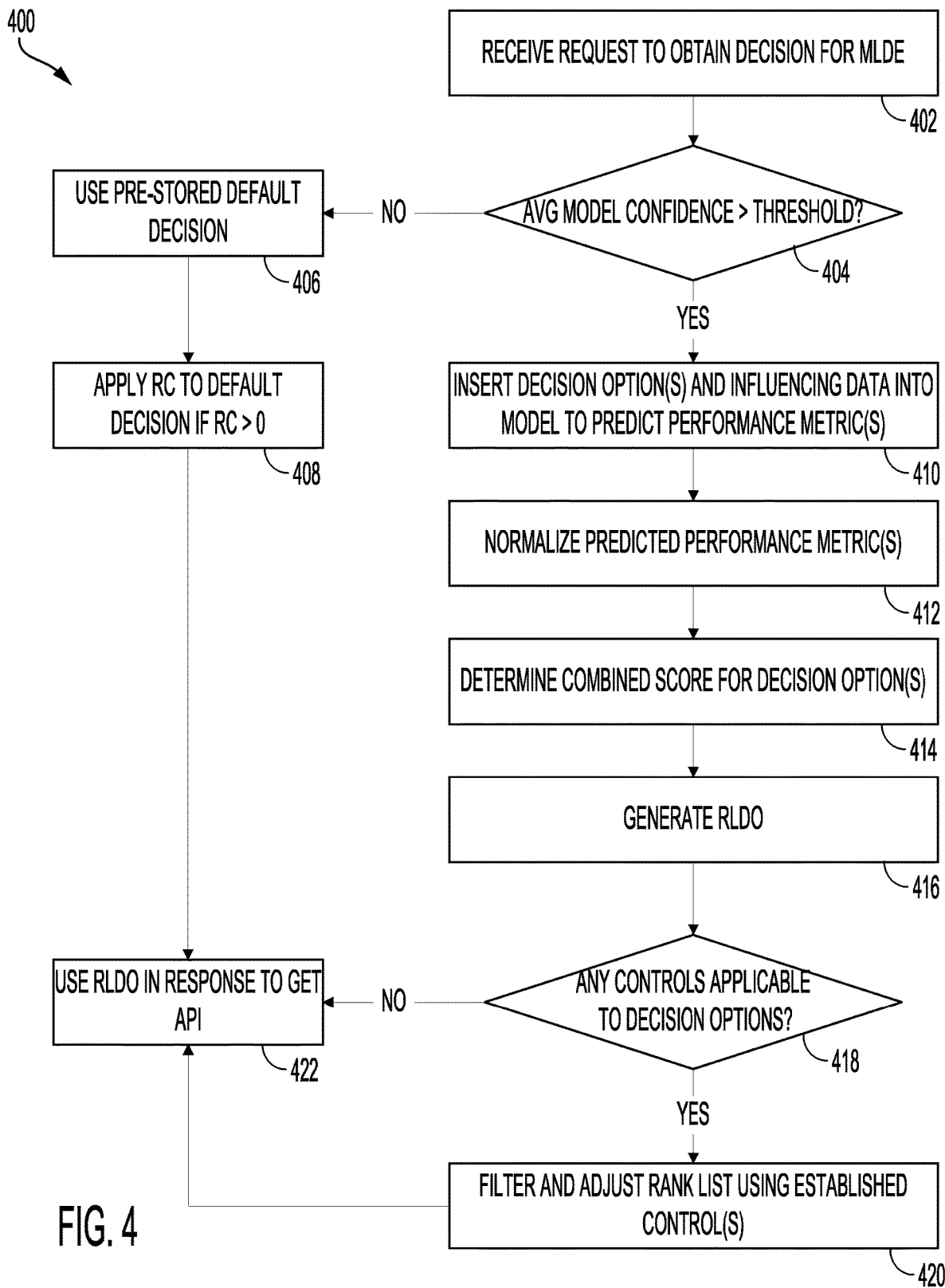
FIG. 4 shows an illustrative example of a process for generating a decision to rank order decision options in accordance with at least one embodiment.

In the previous descriptions above, there have been references to a decision engine. FIG. 4 shows an illustrative example of a process 400 for generating a decision to rank or otherwise order decision options in accordance with at least one embodiment. The decision engine, in an embodiment, is an objective function that is configured to decide the order or best fit of the decision options for a set of predefined decision options. Alternatively, the decision engine can decide the best fit number within a continuous range of numbers. Starting from a request by the MLDE to make a decision at step 402, the decision engine may first determine, at step 404, if it can use ML models. This is a decision point in the software that is defined by the operator. As with a typical ML model, the MLDE's models may have a measure of predictability. An operator can set the predictability of the ML model they want reached before the ML model is used in decisioning. If such a threshold has not been met the decision engine may follow the path as defined at step 406 using the default decision set up by the operator.

Since the earlier decision can feed future models, the system also applies, at step 408, a randomness coefficient. This may adjust the default decision using randomness to broaden the scope of decisioning even without ML models in place. This technique of adding randomness may help the system find new optimal outcomes and give it a broader dataset for future model training data. The operator can set the randomness coefficient in the original definition of the MLDE as described above in FIG. 2 (step 230) as part of the controls.

On other hand if, at step 404, the ML models have reached the predictability threshold, the decision engine can run through its objective function in the following steps. First, each decision option, along with all the associated influencing data inputs which were passed into the decision engine will be put into the ML model at step 410. This may result in the creation of predicted performance metrics for each decision option. The system may normalize these predicted performance metrics at step 412 to be on a consistent scalar with each other. The normalization of the predicted performance metrics may be performed using straight line normalization or some form of logarithmic or polynomial-based normalization.

Since there can be multiple predicted performance metrics per decision option, a weighted matrix may need to be calculated. As an example, assuming the decision options were colors (e.g., red, green, blue), each color could drive a predicted Average Order Value (pAOV) and predicted Probability of Abandoned Cart (pPAC). This may produce the following result:
Red: pAOV=$125, pPAC=25%; Red: 1st
Blue: pAOV=$150, pPAC=60%; Blue: 3rd
Green: pAOV=$200, pPAC=50%; Green: 2nd
The decision engine may implement a method of normalizing the result to be cross comparative and on a consistent scale. The normalization technique can be linear, logarithmic or some other algorithmic scoring mechanism. Thus, scoring may take into account the weighting and direction 414 of the performance metric as defined in the MLDE. These combined scores for the decision options may be used to generate a ranked list.

The resulting ranked list of the decision options (RLDO) 416 may then be filtered by the controls (if any). As mentioned in the MLDE descriptions above, controls (which are optional) may be used to bound the decision options. Thus, if it is determined (at step 418) that there are controls applicable to the decision options, the controls may be applied to reduce or adjust the ranked list outcomes at step 420.

The RLDO is the output of the decision engine and the result of the objective function. This is returned to system making the request of the MLDE in the GET API as defined in 422. For instance, if no controls are applicable, the generated RLDO (as defined in step 416) may be used in response to the GET API. Similarly, if the randomness coefficient is applied to a default decision, the resulting RLDO may also be used in response to the GET API. If controls were applied to the original RLDO generated at step 416, the updated RLDO may be used in response to the GET API.

Model Engine

Figure 5:
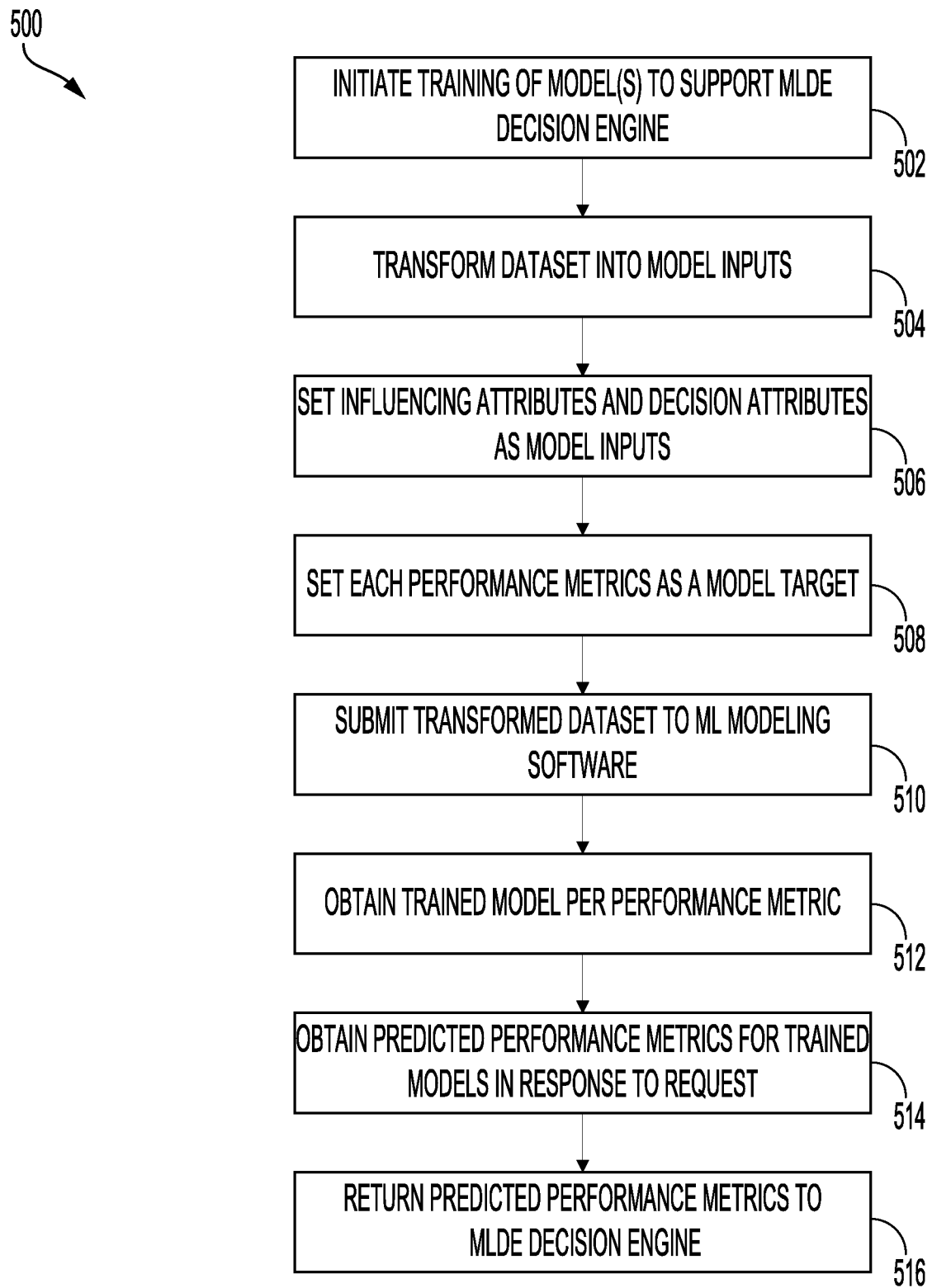
FIG. 5 shows an illustrative example of a process for converting MLDE attributes into inputs for machine learning modeling and artificial intelligence to achieve a rank list of decision options (RLDO) in accordance with at least one embodiment.

The model engine builds the machine learning models (ML models) or artificial intelligence that are referenced in the decision engine and the general description of the MLDE. The MLDE uses these ML models or artificial intelligence to provide an input into the decision by establishing a set of predictions for every scenario associated with each decision option. In order to do that, the ML models or artificial intelligence may be built and run through a linear sequence of events. FIG. 5 shows an illustrative example of a process 500 for converting MLDE attributes into inputs for machine learning modeling to achieve an RLDO in accordance with at least one embodiment.

The first event in the sequence starts with a periodic triggering event at step 502. This event would normally be the collection of enough data in the MLDE's dataset. However, this event may also have a timing-based trigger. For instance, a new ML Model may be built for every 100,000 new data points in the dataset, subject to a maximum frequency of one model building event per hour. Conversely, a model may be built at particular time intervals (e.g., one per month, etc.), subject to a minimum dataset of 1000 new rows within the particular time intervals. Once the pre-established triggering thresholds are met, the MLDE may start to train and build the model.

The first step is an automated transformation of the MLDE dataset into training data set 504. Examples of this include generating multiple sub-datasets for each predictive model that is being built. For instance, one model may be generated per predicted performance metric. In addition to the multiple datasets, the MLDE may also automatically engineer ML features. This feature engineering function may look at the influencing data inputs and the decision data inputs to create a set of engineered ML features at step 506.

Another important component for building ML models is setting the predictive target of the model at step 508. Usually this is the field the model tries to predict. In this case, the field may be the performance metric inputs to the model. As described in the previous e-commerce examples provided above, an MLDE that is trying to decide what color products to show a consumer may establish Average Order Value or Cart Abandonment performance metrics. The goal of the model is to predict these metrics given the engineered features, which themselves are derived from the influencing data inputs, decision options, and preexisting or actively growing MLDE dataset.

Once the engineered features and targets are established, the ML model may be generated with the existing dataset by leveraging model building tools at step 510. In this context the system may generate one or many different predictive models per target and use a model statistic such as "predictability" to select the ones to be used in the MLDE. As noted above, the model engine may use one or more AutoML systems to generate a plurality of different predictive models that may be evaluated according to the selected model statistic. These one or more AutoML systems may incorporate various libraries that correspond to different types of ML models that may leveraged to generate predictive models according to the selected model statistic. The model engine may evaluate each of the predictive models generated by the AutoML systems according to the selected model statistic. Thus, the model engine may use the model statistic for each of the predictive models to select the one to be used in the MLDE.

At step 512, the trained models per performance metric are obtained. These models can take the influencing data and decision options to return predicted performance metrics. The decision engine will use the best performing models that are stored with MLDE to obtain 514 the predicted performance metric for every decision option scenario. The result is the predicted performance metrics by decision option returned to the decision engine at step 516.

Controls

Figure 6:
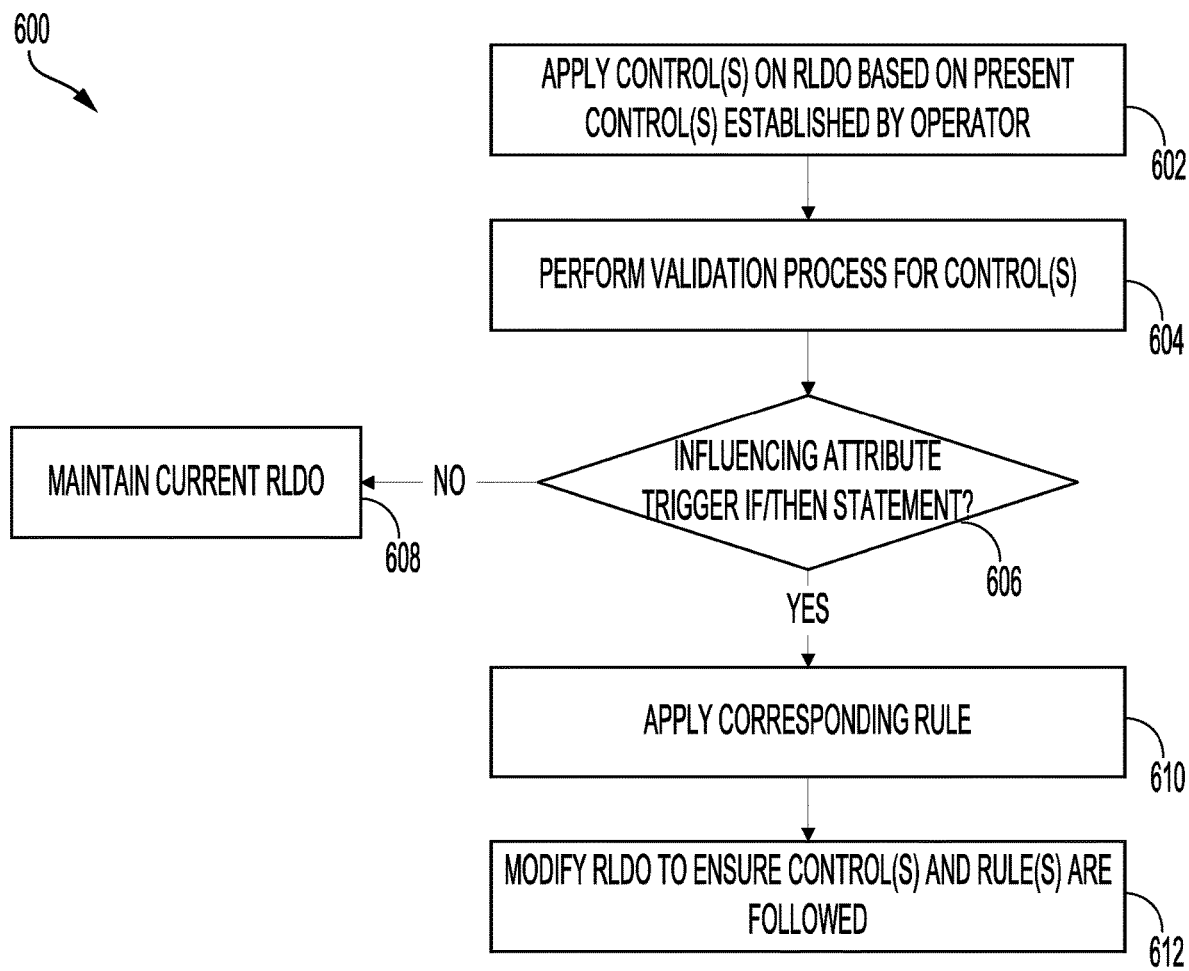
FIG. 6 shows an illustrative example of a process for applying controls to an RLDO to ensure that the RLDO follows applicable controls and rules in accordance with at least one embodiment.

Controls are another subsection of the MLDE system referenced herein. FIG. 6 shows an illustrative example of a process 600 for applying controls to an RLDO to ensure that the RLDO follows applicable controls and rules in accordance with at least one embodiment. Controls add the operator guidelines into the MLDE. Controls are much more about telling the system what not to do versus what to do.

The point of an MLDE is to make decisions that generate the optimal outcomes with as little friction as possible. However, there are some cases where MLDE must be bounded due to legal, compliance, moral, policy and other restrictions. Returning to the example above corresponding to the MLDE description, an operator may want to create an MLDE to determine what advertising promotions will be most effective for a consumer that is visiting an e-commerce web site that has a wide variety of products, including alcoholic products. Assuming age is a data input used in influencing the MLDE's decisioning, the system may initially determine that 19-year-old males are most receptive to a promotion geared towards an alcoholic beverage. Given that this promotion is the in the United States, where the minimum drinking age is 21, this would likely be illegal or at least ill advised. Accordingly, the operator can define a control whereby if the age of the consumer is less than 21, the MLDE is to exclude any decision options corresponding to the promotion of alcoholic products.

The operator defines the controls and the decision engine calls these controls while it is building the RLDO at step 602. Controls defined by the operation may be a function of the data inputs, such as the influencing data inputs. In response to receiving a new set of controls (as defined by the operator), the control are validated, at step 604, to ensure that there are no mutual exclusions or inconsistencies as described in the validation heuristics and validation process of the MLDE.

Before a specific control is applied, each influencing data input is checked against any controls on that specific data input at step 606. If no such control is identified, then the RLDO is left unchanged at step 608. However, if such a control does exist, then the if/then statement is triggered at step 610. Rules are modifications to the RLDO—which include, but are not limited to the following:
+Include ONLY a set of Decision Options
+Exclude one or more Decision Options
+Set a specific RLDO (ignoring the ML based results)
+Set to Top one or more Decision Options
+Set to Bottom one or more Decision Options Using the above example corresponding to a minimum drinking age of 21, a rule may be applied whereby one or more decision options are excluded. For instance, through application of this rule and for an influencing data input corresponding to a user's age, if the age submitted by a user is less than 21, the system would apply the exclusion rule to exclude any decision options corresponding to the promotion of alcoholic products.

All applied rules are treated as "AND" statements such that all rules are equally applied and results of the RLDO are required to pass all applied rules. If such controls lead to rules that create mutually exclusive conditions such as "Include X" and "Exclude X," the exclusion rule will supersede the inclusion rule. Thus, in the event of mutually exclusive conditions being created as a result of conflicting rules, the system may apply the more restrictive rule. Additionally, in the event of mutually exclusive conditions being detected as a result of conflicting rules, alerts may be triggered to indicate the presence of a rules conflict. This may allow the operator to redefine its rules and/or controls in order to resolve the conflict. At step 612, the RLDO may be modified to ensure that the controls and rules are followed.

Synthetic Data Generator

Once the MLDEs are active, the MLDEs may collect, in real-time new data that may be dynamically added to their datasets. This data is unique from a machine learning and artificial intelligence perspective, in that this data's sole purpose is for machine learning or artificial intelligence. This data architecture focuses on the causality (cause and effect) nature of data that is suited for ML model training. Any client with access to their own MLDE data may use this data to potentially build new MLDEs. This real client data may be stored in their own client container, which may be logically (and possibly physically) separated from all other client containers. This may give the system a strong Personally Identifiable Information/Payment Card Industry/General Data Protection Regulation (PII/PCI/GDPR) compliant data storage solution. However, clients without such data may be at a disadvantage and, thus, they may seek such data if/where available. The MLDE development system solves this by introducing a synthetic data solution. This capability described below may not be part of any specific MLDE. However, this capability may leverage existing MLDEs.

Figure 7:
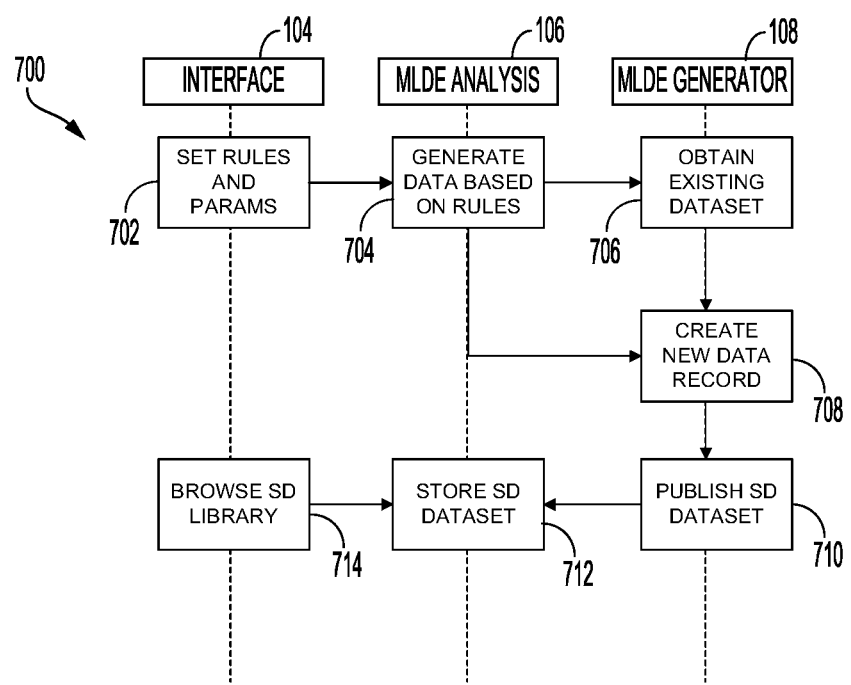
FIG. 7 shows an illustrative example of a flow diagram for generating synthetic data in accordance with at least one embodiment.

The Synthetic Data Generator (SDG) as described in FIG. 7 may be implemented by the MLDE generator sub-system 108 and may use its own access to a client's real data to generate synthetic data that cannot be traced back to real products, people, credit information, and so on. FIG. 7 shows an illustrative example of a flow diagram 700 for generating synthetic data in accordance with at least one embodiment.

An operator, via the interface 104, may define their own rules within the SDG at step 702. These rules may be data descriptors, which may define how tightly or loosely the synthetic data should match the original data. The operator can also set maximum and minimum targets for any numerical data and specifically exclude some data from being the "source" of the synthetic data. Using said configuration and rules, the SDG may be executed by the MLDE analysis sub-system 106 to generate the synthetic data on demand at step 704.

At step 706, the SDG obtains the existing datasets from the MLDE generator sub-system 108, analyzes these datasets, and creates a new synthetic data record at step 708 as guided by the predefined rules in the SDG. The SDG may consider both the columns and rows of the real data. The column will define the range of data possibilities for a field and the rows will establish the probabilistic relationship between a field and the other fields in that row. Then, using the real data record as an input, the SDG may produce, as output, a synthetic data record that may maintain the same aggregated relationships and overall data profile. The SDG will cycle through MLDE datasets to generate a synthetic data version of that same dataset. The synthetic data may have the identical metadata (column headers) as the original, real data.

Once the process is complete, the synthetic data may be published at step 710 by the MLDE generator sub-system 108 and is stored in the MLDE datastore by the MLDE analysis sub-system 106 at step 712. This synthetic data may then be made available to that client as well other potential clients. This can be given away to other clients or sold within the MLDE marketplace and browsable at step 714 via the interface 104. Once acquired to their own client's profile the synthetic data is usable for the creation of other MLDEs or downloadable.

MLDE Marketplace

Figure 8:
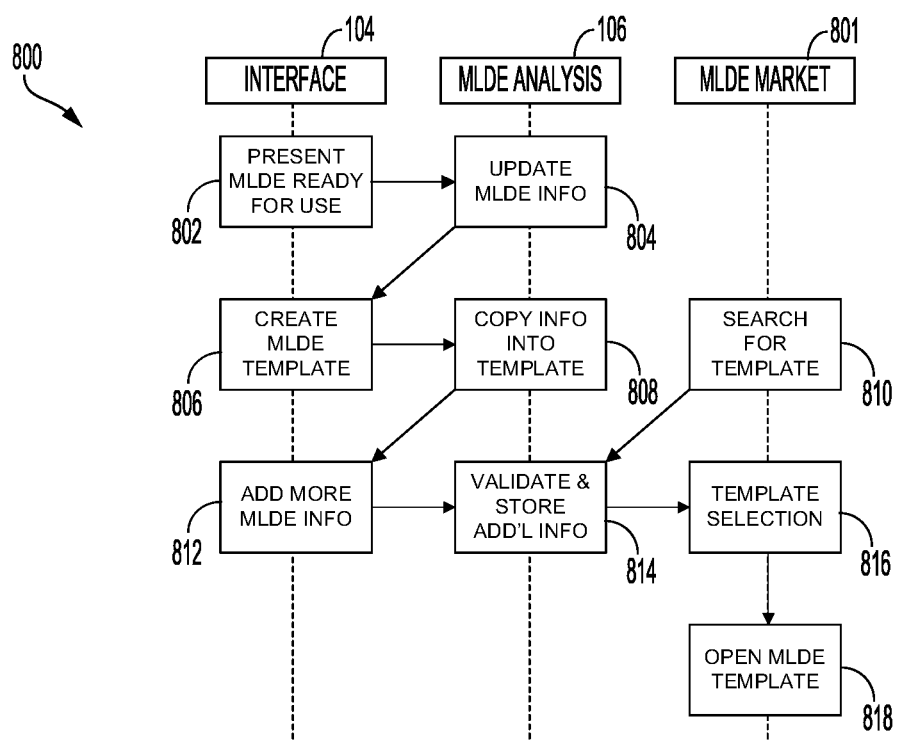
FIG. 8 shows an illustrative example of a flow diagram for making an MLDE available via a marketplace for purchase or licensing by users in accordance with at least one embodiment.

Many consumers of MLDEs would prefer to have the option to purchase prebuilt versions, especially from MLDE expert builders. The MLDE development system, in some instances, may implement a marketplace to allow for the distribution and dissemination of prebuilt MLDEs. For instance, once an operator builds and uses one or more MLDEs, the operation may submit these one or more MLDEs to the Marketplace so that others may buy and use versions of these MLDEs for their own purposes. An MLDE can be packaged with additional information, readme files, source code for implementations, and datasets (real or synthetic). FIG. 8 shows an illustrative example of a flow diagram 800 for making an MLDE available via a marketplace for purchase or licensing by users in accordance with at least one embodiment.

Once the operator has created a new MLDE, the operator may publish a template that is directly derived from this newly created MLDE. Since the template is derived from an existing MLDE, the MLDE attributes may already be stored in the MLDE datastore. At step 802, the operator may be provided, via the interface 104, with a confirmation that the MLDE is considered complete and ready for usage. The operator may pass MLDE information to the MLDE analysis sub-system 106, which may update 804 the MLDE information and pass the updated information to the MLDE datastore. At step 806, the operator may decide whether they would like to publish the MLDE as a template in the MLDE marketplace 801. For instance, via the interface 104, the operator may decide to create a marketable MLDE template that can be sold/licensed in the marketplace 801. If the operator determines that it wishes to create a new marketable MLDE template, they may add some additional information that may be used to provide details regarding the utility of the MLDE and any instructions for implementing the MLDE. As a result, the MLDE analysis sub-system 106 may copy 808 the MLDE information into an MLDE marketplace template (MPT) that will parameterize client specific attributes in the MLDE. The MLDE analysis sub-system may store the MPT in the MLDE datastore.

Beyond just the attribute, metadata, and other components of the MLDE, the operator, at step 812, may also include additional information. This additional MPT information can include a description, category, keywords/tags, dataset (real or synthetic), pricing, licensing restrictions, example code for integration, "read.me" file, screenshots and other images, and content. The MLDE analysis sub-system 106 will validate and store the information associated to the MPT at step 814.

Other users (e.g., purchasers or licensees of MPTs) can browse the available MPTs through the MLDE marketplace. These other users can browse the MLDE marketplace 801 by category or perform a search via keyword at step 810. Once a user has found a desired MPT, they can opt to purchase or license the MPT at step 816. This will automatically copy over the relevant content of the MPT to the user's account or profile, where the user can modify specific components of the MPT to transform the MPT into an MLDE within the user's own MLDE development system account at step 818. Like any other marketplace, the MPTs may be assigned ratings and reviews. Further, these MPTs may be modified over time. MPTs may be sold as individual MPTs or as part of bundle or pack.

Figure 9:
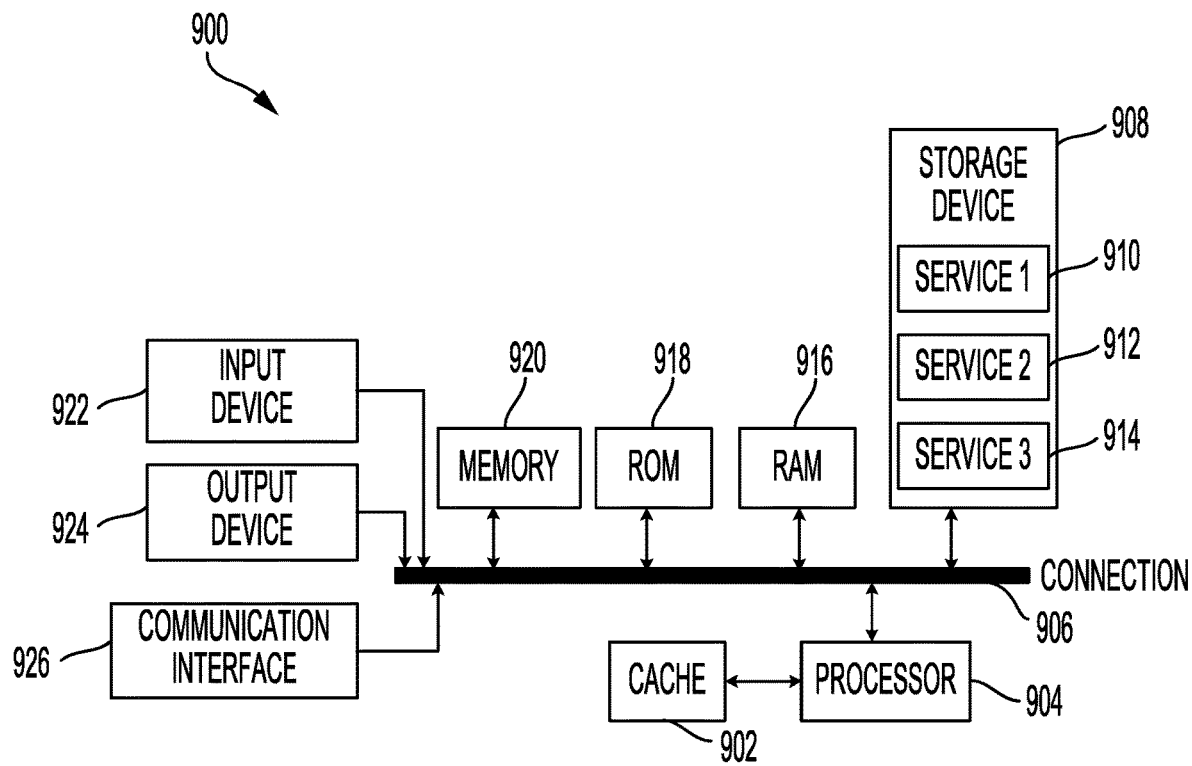
FIG. 9 shows an illustrative example of an environment in which various embodiments can be implemented.

FIG. 9 illustrates a computing system architecture 900 including various components in electrical communication with each other using a connection 906, such as a bus, in accordance with some implementations. Example system architecture 900 includes a processing unit (CPU or processor) 904 and a system connection 906 that couples various system components including the system memory 920, such as ROM 918 and RAM 916, to the processor 904. The system architecture 900 can include a cache 902 of high-speed memory connected directly with, in close proximity to, or integrated as part of the processor 904. The system architecture 900 can copy data from the memory 920 and/or the storage device 908 to the cache 902 for quick access by the processor 904. In this way, the cache can provide a performance boost that avoids processor 904 delays while waiting for data. These and other modules can control or be configured to control the processor 904 to perform various actions.

Other system memory 920 may be available for use as well. The memory 920 can include multiple different types of memory with different performance characteristics. The processor 904 can include any general purpose processor and a hardware or software service, such as service 1 910, service 2 912, and service 3 914 stored in storage device 908, configured to control the processor 904 as well as a special-purpose processor where software instructions are incorporated into the actual processor design. The processor 904 may be a completely self-contained computing system, containing multiple cores or processors, a bus, memory controller, cache, etc. A multi-core processor may be symmetric or asymmetric.

To enable user interaction with the computing system architecture 900, an input device 922 can represent any number of input mechanisms, such as a microphone for speech, a touch-sensitive screen for gesture or graphical input, keyboard, mouse, motion input, speech and so forth. An output device 924 can also be one or more of a number of output mechanisms known to those of skill in the art. In some instances, multimodal systems can enable a user to provide multiple types of input to communicate with the computing system architecture 900. The communications interface 926 can generally govern and manage the user input and system output. There is no restriction on operating on any particular hardware arrangement and therefore the basic features here may easily be substituted for improved hardware or firmware arrangements as they are developed.

Storage device 908 is a non-volatile memory and can be a hard disk or other types of computer readable media which can store data that are accessible by a computer, such as magnetic cassettes, flash memory cards, solid state memory devices, digital versatile disks, cartridges, RAMs 916, ROM 918, and hybrids thereof.

The storage device 908 can include services 910, 912, 914 for controlling the processor 904. Other hardware or software modules are contemplated. The storage device 908 can be connected to the system connection 906. In one aspect, a hardware module that performs a particular function can include the software component stored in a computer-readable medium in connection with the necessary hardware components, such as the processor 904, connection 906, output device 924, and so forth, to carry out the function.

The disclosed methods can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

The disclosed methods can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system. In some embodiments, the disclosed methods can be performed using virtualized environments.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor. In some embodiments, the data may be encrypted.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor. In some embodiments, the software may be encrypted.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DB SCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, metalearning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually affect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:
1. A computer-implemented method comprising:
receiving a request to generate a machine learning-enabled decision engine (MLDE) that is effective for a specific client application, wherein the request defines a set of decision options, a set of data inputs, and a set of performance metric goals that are defined via a user interface for generating MLDEs;
identifying influencing data inputs usable to influence decisioning of the MLDE and performance metrics for the MLDE, wherein the influencing data inputs and the performance metrics are identified based on the set of data inputs and the set of performance metric goals;
generating a set of predictive models for the MLDE, wherein the set of predictive models are generated using one or more automated machine learning (AutoML) systems, wherein the influencing data inputs are used as a set of features for the set of predictive models, and wherein the performance metrics are used as targets for the set of predictive models;
selecting one or more predictive models from the set of predictive models, wherein the one or more predictive models are selected based on an evaluation of the set of predictive models according to a set of model statistics;
receiving a set of controls to limit decision making of the one or more predictive models associated with the MLDE, wherein the set of controls are received via the user interface for generating the MLDEs, and wherein the set of controls are used to limit the set of decision options;
validating the MLDE, wherein the MLDE is validated using the influencing data inputs, the performance metrics, and the set of controls defined via the user interface, and wherein the MLDE is effective for the specific client application;

converting the MLDE into a microservice, wherein the microservice is accessible via one or more application programming interfaces (APIs) accessible for the specific client application, wherein the microservice is available for execution of use cases to generate ranked lists of decision options (RLDOs) from the set of decision options for the use cases, wherein the RLDOs are generated according to the set of controls used to limit the set of decision options;

obtaining performance data associated with a set of decisions selected from the RLDOs for a particular set of influencing data corresponding to the influencing data inputs, wherein the performance data is obtained using the one or more APIs and as the use cases are executed;

dynamically updating a dataset associated with the MLDE, wherein the dataset is dynamically updated as the performance data is obtained; and continuously retraining the one or more predictive models associated with the MLDE, wherein the one or more predictive models are continuously retrained using the dataset as the dataset is dynamically updated.

2. The computer-implemented method of claim 1, further comprising:

generating a synthetic dataset, wherein the synthetic dataset is generated using the updated dataset as input to a generator configured to apply predefined rules corresponding to probabilistic relationships among various fields of the updated dataset; and providing the synthetic dataset for use in generating new MLDEs.

3. The computer-implemented method of claim 1, wherein the set of controls are based on conditional statements associated with one or more influencing attributes associated with the influencing data inputs and corresponding rules.

4. The computer-implemented method of claim 1, wherein converting the MLDE into the microservice includes publishing a template corresponding to the MLDE to a marketplace.

5. The computer-implemented method of claim 1, wherein validating the MLDE includes applying one or more heuristics to the MLDE, and wherein the one or more heuristics are configured to determine whether the MLDE complies with the set of controls.

6. A system, comprising:

one or more processors; and memory storing thereon instructions that, as a result of being executed by the one or more processors, cause the system to:

receive a request to generate a machine learning-enabled decision engine (MLDE) that is effective for a specific client application, wherein the request defines a set of decision options, a set of data inputs, and a set of performance metric goals that are defined via a user interface for generating MLDEs;

identify influencing data inputs usable to influence decisioning of the MLDE and performance metrics for the MLDE, wherein the influencing data inputs and the performance metrics are identified based on the set of data inputs and the set of performance metric goals;

generate a set of predictive models for the MLDE, wherein the set of predictive models are generated using one or more automated machine learning (AutoML) systems, wherein the influencing data inputs are used as a set of features for the set of predictive models, and wherein the performance metrics are used as targets for the set of predictive models;

select one or more predictive models from the set of predictive models, wherein the one or more predictive models are selected based on an evaluation of the set of predictive models according to a set of model statistics;

receive a set of controls to limit decision making of the one or more predictive models associated with the MLDE, wherein the set of controls are received via the user interface for generating the MLDEs, and wherein the set of controls are used to limit the set of decision options;

validate the MLDE, wherein the MLDE is validated using the influencing data inputs, the performance metrics, and the set of controls defined via the user interface, and wherein the MLDE is effective for the specific client application;

convert the MLDE into a microservice, wherein the microservice is accessible via one or more application programming interfaces (APIs) accessible for the specific client application, wherein the microservice is available for execution of use cases to generate ranked lists of decision options (RLDOs) from the set of decision options for the use cases, wherein the RLDOs are generated according to the set of controls used to limit the set of decision options;

obtain performance data associated with a set of decisions selected from the RLDOs for a particular set of influencing data corresponding to the influencing data inputs, wherein the performance data is obtained using the one or more APIs and as the use cases are executed;

dynamically update a dataset associated with the MLDE, wherein the dataset is dynamically updated as the performance data is obtained; and continuously retrain the one or more predictive models associated with the MLDE, wherein the one or more predictive models are continuously retrained using the dataset as the dataset is dynamically updated.

7. The system of claim 6, wherein the instructions further cause the system to:

generate a synthetic dataset, wherein the synthetic dataset is generated using the updated dataset as input to a generator configured to apply predefined rules corresponding to probabilistic relationships among various fields of the updated dataset; and provide the synthetic dataset for use in generating new MLDEs.

8. The system of claim 6, wherein the set of controls are based on conditional statements associated with one or more influencing attributes associated with the influencing data inputs and corresponding rules.

9. The system of claim 6, wherein the instructions that cause the system to make convert the MLDE into the microservice further cause the system to:

publish a template corresponding to the MLDE to a marketplace.

10. The system of claim 6, wherein the instructions that cause the system to validate the MLDE further cause the system to:

apply one or more heuristics to the MLDE, wherein the one or more heuristics are configured to determine whether the MLDE complies with the set of controls.

11. A non-transitory, computer-readable storage medium storing thereon executable instructions that, as a result of being executed by one or more processors of a computer system, cause the computer system to:
receive a request to generate a machine learning-enabled decision engine (MLDE) that is effective for a specific client application, wherein the request defines a set of decision options, a set of data inputs, and a set of performance metric goals that are defined via a user interface for generating MLDEs;
identify influencing data inputs usable to influence decisioning of the MLDE and performance metrics for the MLDE, wherein the influencing data inputs and the performance metrics are identified based on the set of data inputs and the set of performance metric goals;
generate a set of predictive models for the MLDE, wherein the set of predictive models are generated using one or more automated machine learning (AutoML) systems, wherein the influencing data inputs are used as a set of features for the set of predictive models, and wherein the performance metrics are used as targets for the set of predictive models;
select one or more predictive models from the set of predictive models, wherein the one or more predictive models are selected based on an evaluation of the set of predictive models according to a set of model statistics;
receive a set of controls to limit decision making of the one or more predictive models associated with the MLDE, wherein the set of controls are received via the user interface for generating the MLDEs, and wherein the set of controls are used to limit the set of decision options;
validate the MLDE, wherein the MLDE is validated using the influencing data inputs, the performance metrics, and the set of controls defined via the user interface, and wherein the MLDE is effective for the specific client application;
convert the MLDE into a microservice, wherein the microservice is accessible via one or more application programming interfaces (APIs) accessible for the specific client application, wherein the microservice is available for execution of use cases to generate ranked lists of decision options (RLDOs) from the set of decision options for the use cases, wherein the RLDOs are generated according to the set of controls used to limit the set of decision options;
obtain performance data associated with a set of decisions selected from the RLDOs for a particular set of influencing data corresponding to the influencing data inputs, wherein the performance data is obtained using the one or more APIs and as the use cases are executed;
dynamically update a dataset associated with the MLDE, wherein the dataset is dynamically updated as the performance data is obtained; and
continuously retrain the one or more predictive models associated with the MLDE, wherein the one or more predictive models are continuously retrained using the dataset as the dataset is dynamically updated.

12. The non-transitory, computer-readable storage medium of claim 11, wherein the executable instructions further cause the computer system to:
generate a synthetic dataset, wherein the synthetic dataset is generated using the updated dataset as input to a generator configured to apply predefined rules corresponding to probabilistic relationships among various fields of the updated dataset; and
provide the synthetic dataset for use in generating new MLDEs.

13. The non-transitory, computer-readable storage medium of claim 11, wherein the set of controls are based on conditional statements associated with one or more influencing attributes associated with the influencing data inputs and corresponding rules.

14. The non-transitory, computer-readable storage medium of claim 11, wherein the executable instructions that cause the computer system to convert the MLDE into the microservice further cause the computer system to:
publish a template corresponding to the MLDE to a marketplace.

15. The non-transitory, computer-readable storage medium of claim 11, wherein the executable instructions that cause the computer system to validate the MLDE further cause the computer system to:
apply one or more heuristics to the MLDE, wherein the one or more heuristics are configured to determine whether the MLDE complies with the set of controls.

* * * * *